WINDING MECHANISM

Filed Jan. 23, 1947 5 Sheets-Sheet 1

INVENTOR
SEMI JOSEPH BEGUN
BY Eber J. Hyde
ATTORNEY

INVENTOR.
S. J. BEGUN
BY Michael S. Pinkes
ATTORNEY

Dec. 23, 1952 S. J. BEGUN 2,622,811

WINDING MECHANISM

Filed Jan. 23, 1947 5 Sheets-Sheet 3

INVENTOR.
S. J. BEGUN
BY Michael S. Pinkus

ATTORNEY

Dec. 23, 1952 S. J. BEGUN 2,622,811

WINDING MECHANISM

Filed Jan. 23, 1947 5 Sheets-Sheet 4

INVENTOR.
SEMI JOSEPH BEGUN
BY

ATTORNEY

Dec. 23, 1952 S. J. BEGUN 2,622,811

WINDING MECHANISM

Filed Jan. 23, 1947 5 Sheets-Sheet 5

INVENTOR
S. J. BEGUN
BY Michael S. Pinkle
ATTORNEY

UNITED STATES PATENT OFFICE 2,622,811

WINDING MECHANISM

Semi Joseph Begun, Cleveland Heights, Ohio, assignor to The Brush Development Company, Cleveland, Ohio, a corporation of Ohio Application January 23, 1947, Serial No. 723,735

10 Claims. (Cl. 242—54)

This invention relates to magnetic recording and reproducing and more specifically to magnetic transducing apparatus in which an elongated record track is impelled of substantially constant speed past a magnetic transducing head.

Among the objects of this invention is novel transducing apparatus in which an elongated record track is impelled at the desired substantially constant speed by frictionally engaging it with the periphery of a constant speed capstan drive by merely contacting the record track with the outer surface of the capstan.

Additional objects of the invention include novel record track impelling controls for preventing the "throwing" of record track and terminating the actuation of the impelling means when the record track movement is substantially complete.

The foregoing and other objects of the invention will be best understood from the following description of exemplifications thereof, reference being had to the accompanying drawings wherein.

Figure 9:
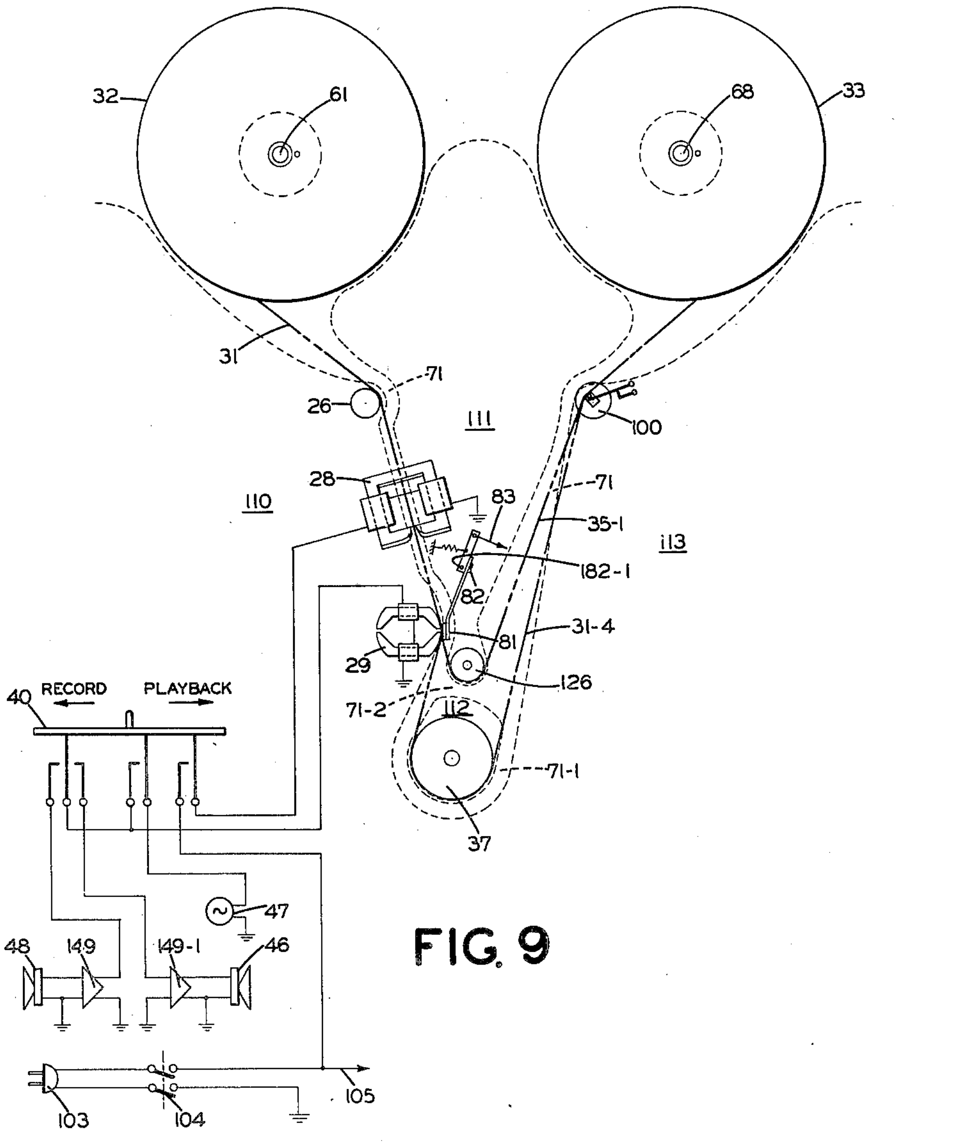

Fig. 9 diagrammatically illustrates a modified form of magnetic transducing apparatus.

Figure 10:
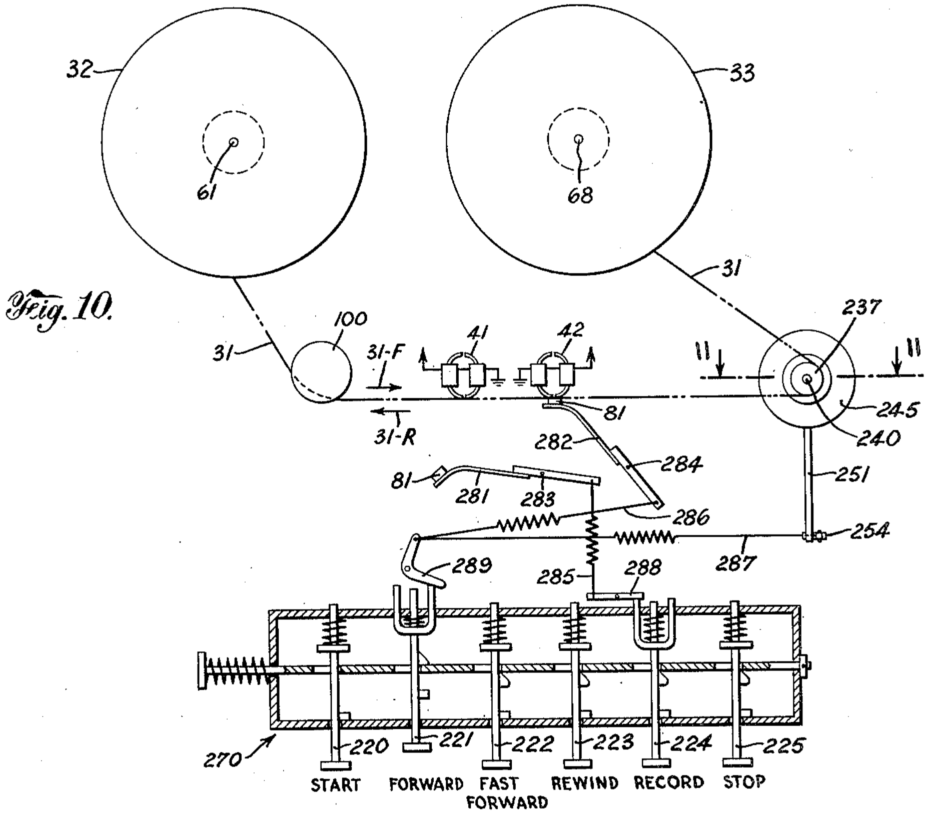

Fig. 10 illustrates a further form of magnetic transducing system according to the invention.

Figure 11:
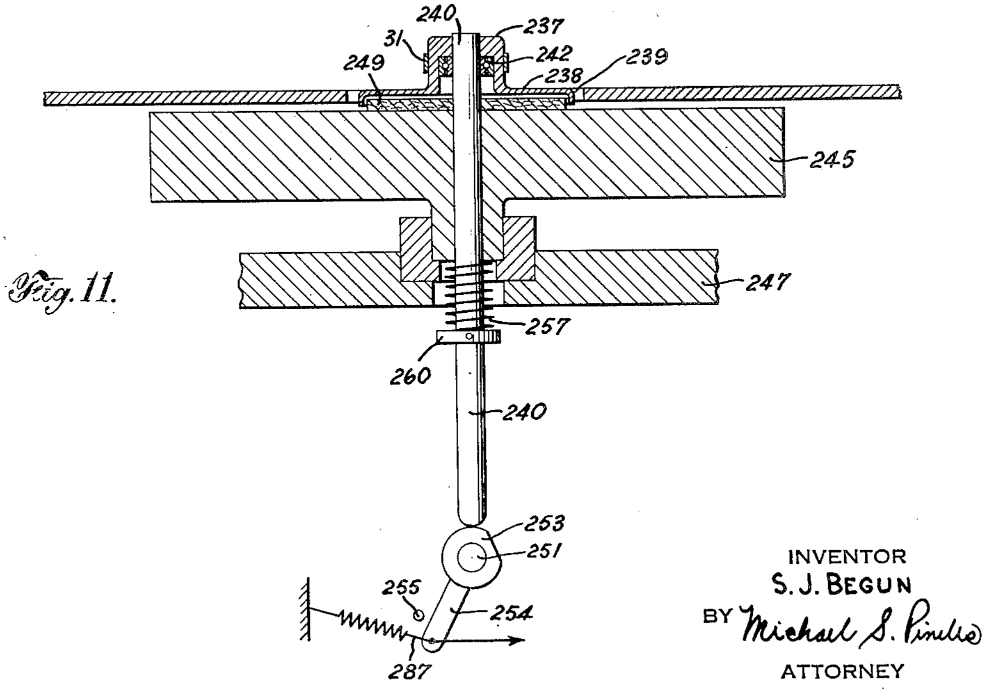

Fig. 11 is a sectional view showing the details of one form of the capstan disengaging mechanism.

In the copending application of Otto Kornei, Serial No. 685,092, filed July 20, 1946, there is described a novel magnetic recording and reproducing system and method utilizing as a magnetic recording medium a stratum of bonding compound having substantially uniformly dispersed therein permanently magnetizable powder particles and forming a thin flexible tape- or filament-like magnetic record track and cooperating with a magnetic record transducer head, the pole faces of which are aligned along one side of the surface of the stratum and capable of recording magnetic signals with a signal-to-noise ratio of the order of about 50 db., while the recording medium moves only at a relatively very low speed, such as eight inches per second.

The magnetic recording apparatus of the present invention provides a novel reeling mechanism for such recording system which makes it possible to produce high quality magnetic records on such thin, flexible, although mechanically weak, magnetic recording media with a relatively high degree of fidelity, while assuring that the magnetic forces to which the thin, flexible and relatively-weak magnetic recording media are subjected during the reeling operation, are at all times kept so low as to practically eliminate breakage of the recording medium not only when it is reeled at a slow speed during a recording or playback operation, but also while it is reeled at an extremely high speed during a rewinding operation or when it is desired to reel it in forward direction at a high speed.

Figure 1:
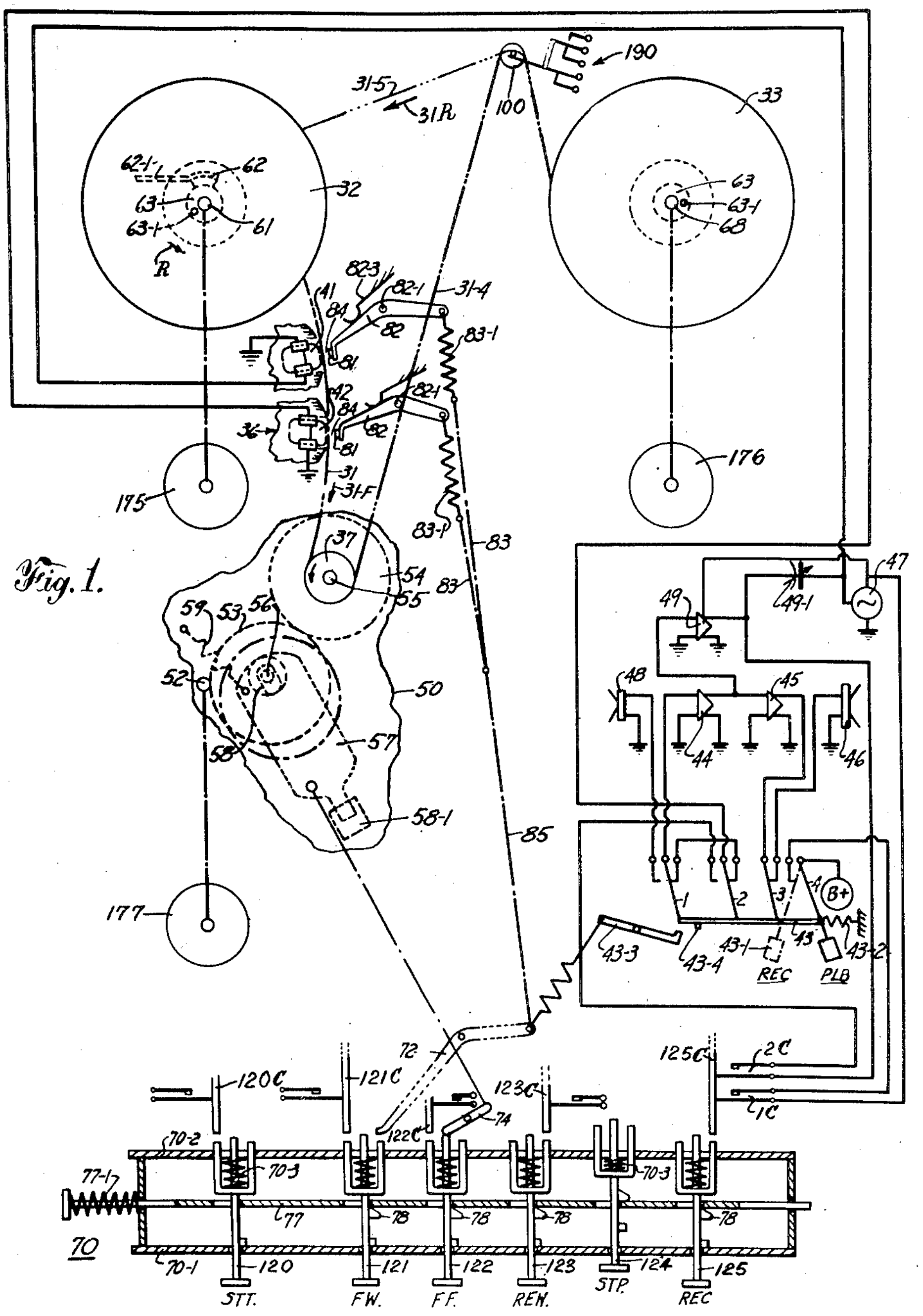
Fig. 1 is a simplified diagrammatic view of the essential elements of a magnetic transducing apparatus according to the invention.
Figures 2, 4, 5:
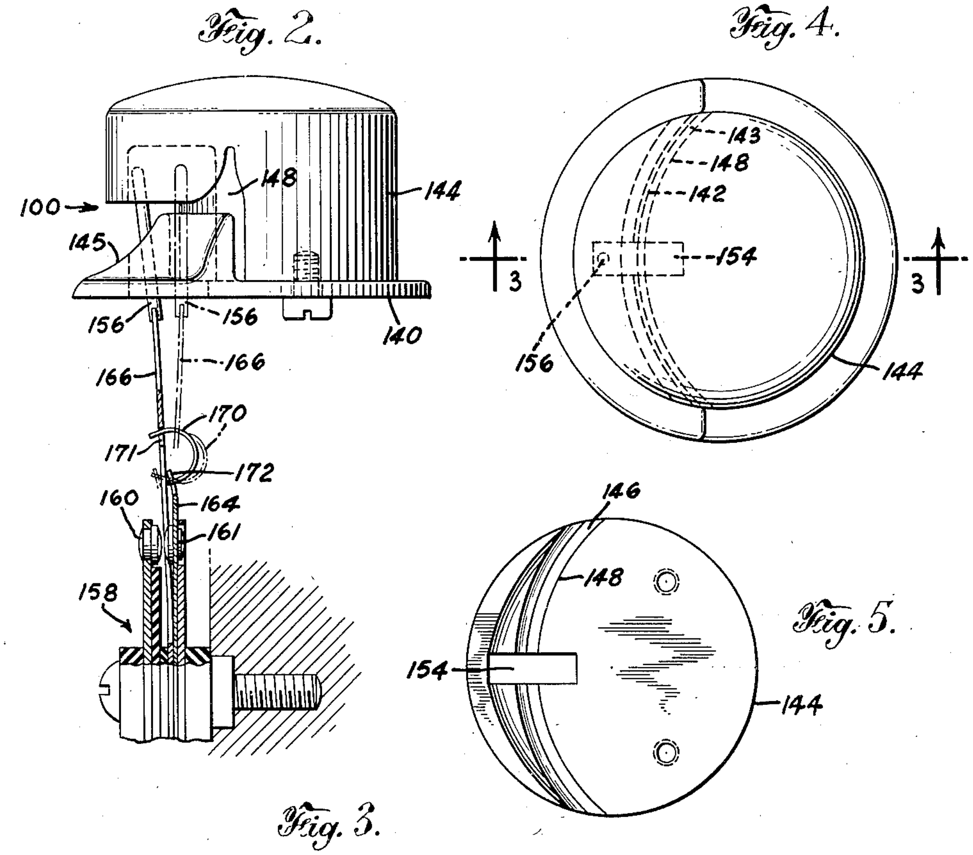
Fig. 2 is a side view of a novel limit switch assembly.
Figs. 3 and 4 are sectional and top views of the guide portions of the switch assembly of Fig. 2.
Fig. 5 is a bottom view of the upper guide member of the switch assembly.

Figs. 1 and 2 illustrate in a simplified diagrammatic manner the general relationship of the mechanical, magnetic and electric elements of a mechanically-simple form of a magnetic recording and reproducing apparatus of the invention designed specifically for use in connection with a recording medium formed of a thin limp elongated record member, such as a tape made of paper or a plastic or synthetic resin compound, provided at least one exposed surface with a layer of permanently magnetizable powder dispersed in a bonding compound forming part of the recording medium.

However, various features of the invention disclosed herein are applicable to other magnetic recording media, such as in the form of thin filaments, of fibre or filament forming linear polymers, or threads of silk, embodying or coated with a layer of magnetizable particles. Some of the features of the invention are also applicable to magnetic recording media formed of metallic ferro-magnetic tapes, filaments and wires.

In Figs. 1 and 2 the magnetic recording medium is indicated by dash-double-dot line 31, and is arranged to be reeled from supply reel 32 onto take-up reel 33. The supply reel 32 and the take-up reel 33 are mounted on reel shafts 34 and 35, respectively, which are driven by reel drive mechanism so that during the recording and the playback process the recording medium 31 is impelled in the direction of the arrow 31–F, and reeled from supply reel 32 onto the take-up reel 33. In order to play back the recorded program or to make a new record on the recording medium, it must be rewound or reeled from take-up reel 33 onto supply reel 32.

To simplify the description of the features of the invention, a slow speed reeling operation in the direction of the arrow 31–F, during which a new record is made on the recording medium or a previously made record is played back, will be designated a forward reeling operation, reel 32 will be designated the supply reel and reel 33, the take-up reel. In addition, the fast rewinding operation during which the recording medium is reeled back from the takeup reel 33 on the supply reel 32 in the direction indicated by the arrow 31–R will be designated as the rewind operation, and a fast reeling operation in the forward direction indicated by the arrow 31–F, in order to quickly reach a desired point on the recording medium for playing back a record sequence made thereon or for replacing it with another record sequence, will be designated as the fast forwarding reeling operation.

In the particular form of recording apparatus shown, the take-up reel is driven in counter-clockwise direction during a forward reeling operation, and the supply reel 32 is similarly driven in counter-clockwise direction as indicated by the arrow R during the rewinding operation. The reels 32, 33 are similar to those used for standard amateur-type motion picture reels. Thus, in the case of a recording medium formed of a thin tape one-quarter of an inch wide, each reel may be made with an inner reel core 1⅜ inches in diameter so that a reel seven inches in diameter is sufficient for storing a length of the recording medium required to make a record of one-half hour duration.

During the recording or playback process the recording medium 31 is guided from the supply reel 32 past a record transducer head structure 36, along a forward drive path indicated by the dash-double-dot line 31—4, so as to couplingly engage the periphery of a capstan-like roller 37 and pass therefrom along the guide surface of a limit control member 100 to the take-up reel 33. During the rewinding process, the recording medium 31 may be guided along the same path just described, as it is reeled from the take-up reel 33 onto the supply reel 32. However, it is simpler to remove the record tape 31 from the capstan roller and carry on the rewinding process by guiding the tape 31 directly back from the take-up reel 33 onto the supply reel 32, along the fast reeling or rewind path indicated by the dash-triple-dot line 31—5, the tape being guided along the guide surface of a limit control member 100. This fast reeling path 31—5 may also be utilized whenever it is desired to reel the record member fast in forward direction on the take-up reel, for instance, in order to quickly reach a desired portion of a long record.

The limit control member is combined with limit switches 190 which are actuated from a non-operated position to the operated position shown when the limit control member is operated by the recording medium 31.

The magnetic head structure 36 is not part of the present invention and may be of the type described in the copending Begun application Serial No. 688,738, filed August 6, 1946, issued as Patent No. 2,513,617 on July 4, 1950, and the application of Otto Kornei, Serial No. 688,034, filed August 2, 1946, issued as Patent No. 2,523,576 on September 26, 1950. The transducer head structure 36 shown has an erasing head 41 and a record transducing head 42 each provided with windings and a magnetic core structure which has pole pieces separated by a non-magnetic gap along which the recording medium is moving in the direction of the arrow 31–F during a magnetic recording or playback process.

During the magnetic recording process, each element of the recording medium 31 passes successively first past the gap region of the erasing head 41 and then past the gap region of the recording head 42. The recording system shown in Fig. 1 is arranged to carry on magnetic recording and reproducing operations under the control of a multi-blade recording switch 43 which controls the electric circuit connections of the recording head structure with the amplifier and signal pickup and reproducing devices of the system, additional control means, generally designated 70, serving to provide for the proper operation of the driving mechanism during the recording, playback and other reeling operations.

The recording switch 43 is a standard multi-blade switch shown operated manually by a knob between the full-line right-hand playback position shown and the left-hand dotted-line recording position 43—1. The drive control unit 70 is indicated in Fig. 1 diagrammatically as a conventional push-button type selector control arrangement provided with a series of button-operated push rods 120, 121, 122, 123, 124 and 125, also designated by the legends STRT for start, FW for forward, FF for fast forward, REW for rewind, STP for stop, and REC for record.

In such conventional push-rod selector control mechanism, a slidably mounted latch bar 77, which is biased to a latching position as by a spring 77—1, is arranged to retain in an inward operative position one or more of the previously actuated push rods, such as push rod 75 shown latched in the inward position, the latch bar 77 being actuated to release the latched push rod whenever it is actuated in lateral direction against the biasing action of spring 77—1 by a cam surface of a latch projection 78 shown provided on the push rods 120 to 125 which are to be latched when selectively actuated to an inward position.

The latch bar and the mounting structure elements 70—1, 70—2 of the push-rod mechanism are provided with suitable slits through which the several push rods are arranged to be slidably movable between the inward operative position and the released outward position to which they are biased by the springs 70—3 encircling a prong portion of each push rod. The substantially rigid frame structure of such push rod mechanism may be also utilized to support sets of control switches 120C, 121C, 122C, 123C and 125C as indicated in Fig. 1 so that whenever any one of the push rods is pushed to the inward operated position, it will actuate its switch set to the operated position.

It will be noted that the push rod 120 of the starting switch rod is not provided with a latch projection 78 so that when it is actuated to the inward operated position, it and its switch set 120C are automatically returned to the non-operated position. Furthermore, since the push rod 120 of the starting switch does not have a latch projection 78, it does not release any of the other push rods from an inward operated position to which they may have been actuated before actuation of the starting switch push rod 120.

In addition, as indicated diagrammatically in Fig. 1, the framework of the push-rod mechanism 70 has mounted thereon mechanical elements, such as pivotally mounted levers 72 and 74 which are arranged so that whenever the respective push rods 121, 122 are actuated to the inward operated position, the respective levers 72, 74 are actuated from the non-operated position shown to an operated position for performing a desired mechanical control operation, as explained hereinafter. Although the push-rod selector control arrangement is shown in Fig. 1 for controlling the operation of the switches and mechanical control elements of the reeling mechanism, other types of analogous control arrangements may be used, for instance, a rotary type selector control arrangement movable to a plurality of different angular positions and provided with cam elements for selectively actuating the different switches and the different mechanical control elements in the different settings of the rotary control member.

With the control arrangement of Fig. 1 as shown, a record recorded on the recording medium 31 will be played back when the main recording switch 43 is in the full-line position shown while the main recording switch 43 is in the full-line position shown while the recording track 31 is reeled on the take-up reel 33. In such playback condition, the recording switch 43 establishes the following playback circuits:

Contacts 1 and 2 of the recording switch 43 connect the lead from the windings of the recording head 42 which now operates as a playback head to the input side of a pre-amplifier 44, the output of which is impressed on an additional playback amplifier 45, the output side of which is connected through switch blade 3 of the recording switch 43 in its playback position to the reproducing device shown in the form of a loudspeaker 46.

In order to make a new record on a portion of the moving recording medium 31 when the sets of switches 121C and 125C are operated by the push-button rods 121 and 125 in the manner explained hereinafter, the recording switch 43 has to be thrown to the left-hand dotted-line position 43—1 in which it establishes in connection with the other operated switches of the device the following recording circuit:

Contact blade 4 of the recording switch 43 in its left-hand position, in conjunction with contact 1C of push rod switch 125C connects a source of high frequency oscillations, such as an oscillator 47 to a source of positive electric power supply indicated by (B+). The oscillator circuit as well as the other analogous circuits described hereinafter, are shown completed by conventionally indicated ground connections to which are also connected the negative terminals of all D. C. supply sources. High frequency oscillator 47 is shown connected directly to the windings of the erasing head 41.

The high frequency erasing current supplied by the oscillator 47 to the windings of the erasing head 41 is of sufficiently large amplitude so that each element of the thin magnetic recording medium 31 passing the gap region of the erasing head 41 is subjected to an alternating flux strong enough to erase any previous magnetic signal records impressed on the moving magnetic recording medium 31 and restore the magnetic elements thereof to a magnetically neutral condition.

After being subjected to the magnetic erasing action by the erasing head, each element of the moving recording medium 31, upon reaching the gap region of the recording head 42, is subjected to the combined action of a magnetic recording flux produced by the amplified signal currents that are to be recorded and the superposed high frequency biasing flux component. In Fig. 1, a conventionally shown microphone 48 serves as a source of signals which are to be recorded, and blade 1 of the recording switch 43 in its left-hand recording position connects the microphone 48 to the input side of the pre-amplifier 44, the output of which is impressed on an additional recording amplifier stage 49, the output of which is supplied to the windings of the recording head 42 by a circuit including the operated contacts 20 of the push rod switch 125–C and the contacts of the contact blade 2 of the recording switch 43 in the left-hand recording position, the circuit being completed by the ground connections shown.

The high frequency bias component of the recording flux is produced in the recording head 42 by a high frequency current component derived from the oscillator 47 through an adjustable coupling condenser 49—1, the high frequency component of the current being mixed with the amplified output of the recording amplifier 49 and supplied to the windings of the recording head 42 through the previously described circuit connection. Coupling condenser 49—1 and the other circuit elements of the system are designed and adjusted to mix a suitable component of the high frequency oscillations produced by the oscillator 47 with the amplified signal current supplied by the signal source, such as microphone 48 in such manner as to produce in the non-magnetic gap region of the recording head 42 the desired combination of signal recording flux and the superposed high frequency biasing flux component.

In general, when recording signals of the audible frequency range, good results are obtained by using a high frequency biasing flux of about 25 to 30 kilocycles per second, and the same source of high-frequency oscillations may be used in supplying the relatively large high-frequency erasing current to the erasing head 41, as well as the relatively small high-frequency biasing component to the recording head 42.

As indicated, the additional amplifier 49 may be arranged to be supplied with its anode potential through the same circuit which supplies the positive B potential to the oscillator 47, so that the recording amplifier 49 is rendered operative only when the recording switch 43 is in the left-hand recording position.

According to the invention, the driving elements which impart driving forces to the recording medium 31 and cause it to be reeled from one reel to the other are interconnected to the elements which impel the reels by yieldable coupling means which subject the thin flexible recording medium at all times only to very limited forces just sufficient to take up its slack, but insufficient to maintain stable contact conditions between the pole faces of the recording and erasing heads 42, 41 and the elements of the recording medium moving past it.

Fig. 1 indicates diagrammatically one simple form of a driving arrangement based on the principles of the invention. During the recording or playback operation or during the normal forward reeling operation, the recording medium 31 is impelled at a constant speed past the two heads 41, 42 through its engagement with the capstan roller 37 forming part of constant speed impelling means. The constant speed impelling means include an electric motor 177 having a shaft 52 which is coupled through a rubber-tired floating coupling pulley 53 to the rim of a fly-wheel member 54 to which the constant speed impelling roller or capstan 37 is connected, the capstan roller 37 and the fly wheel 54 having a common shaft 55 serving as their revolving support.

In order to prevent the recording medium, such as the tape or filament 31, withdrawn from the supply reel 32 from becoming slack, and in order to assure that it moves at all times under a small limited force, a shaft 61 on which the supply reel 32 is mounted may be subjected to a limited braking action exerted, for instance, by a braking pad 62 supported by a resilient brake arm 62—1 and engaging the surface of a collar or disc 63 affixed to the shaft 61 and which is shown serving as the coupling seat on which the supply reel 32 is seated.

In the specific drive arrangement shown, the shaft 61 forms a revolving part of an electric motor 175 suitably supported on the frame structure of the reeling mechanism underneath a mounting panel so as to expose through a hold in the top of the panel the seating member 63 of the shaft. The seating member or collar 63 affixed to the shaft just below its upwardly projecting end may be provided with an upwardly projecting coupling or key pin 63—1 arranged to interfit with a coupling notch extending from the central hole formed on the hub of each reel 32, 33 so as to establish a coupling connection between the shaft 61 and a reel, such as reel 32, seated on the seating collar 63. Alternatively, each reel support shaft may be provided with a transversely extending key arranged to interfit with coupling notches extending from the central hole formed in the hub of the reel.

In one commercial form of a recording mechanism of the type shown in Fig. 1, each of the reels 32, 33 designed to revolve around a vertical axis.

Reel 33 is similarly supported on a similar seating disc 63 of another reel drive shaft 68 which in the arrangement shown in Fig. 1 forms a revolving part of another electric motor 176 supported underneath the top panel in the same manner as the elements of the motor 175 which serves as a revolvable support for the reel 32. Through the medium of the three electric motors the driving shaft of the supply reel 32 and the take-up reel 33 are intercoupled with the drive mechanism of the constant speed normal forward drive capstan 37.

As indicated in Fig. 1, the capstan roller 37 with its fly wheel 54 may be mounted in revolve on the shaft 55 which is held affixed to a mounting plate 50 which is secured, for instance, through a plurality of spacer rods, not shown, to the underside of the panel wall along which the reels and the other exposed elements of the driving mechanism are located in exposed positions. The motor 177 is suitably affixed to the underside of the mounting plate 50 so that the exposed upper shaft end of the motor shaft 52 projects through a hole in the mounting plate and faces a peripheral portion of the rubber-tired coupling pulley 53 through which the shaft is coupled to the metallic periphery of the fly wheel 54. The floating coupling pulley 53 is mounted in a manner similar to the conventional mountings of the floating coupling pulleys in phonograph drives.

As indicated, the coupling pulley 53 is rotatably mounted on a shaft post 56 held affixed to a plate-like slider member 57. The slider plate 57 is slidingly interconnected in a conventional way with apertures 58, 58—1 of the motor mounting plate 50 and is biased, as by a tension spring 59, connected between a fixed portion of the slider 57 and a fixed portion of the mounting plate 50, so as to maintain the rubber tire of the coupling pulley 53 in coupling engagement with a motor shaft 52 and the fly wheel 54 for transmitting thereto and to the capstan 37 a rotary motion which causes the capstan roller 53 to impart to the recording medium or tape 31 the required flutter-free low constant speed, the rubber-tired coupling pulley with the fly wheel 54 serving as a filter for filtering out any non-uniformities of the motion transmitted by the motor 177.

In a commercial embodiment of the driving mechanism of the construction shown in Fig. 1, the three motors are high-speed induction motors similar to the type commonly used in small turntable drives. The motors however may be of a relatively higher torque to enable suitable driving of a reel full of tape. In this driving arrangement, the shafts of the two motors 175, 176 form revolvable supports for the two reels 32, 33 and the bearings of these motors serve as journalling supports for the shafts 61, 68 of the two reels.

The surface of the capstan roller 37 is provided with a surface layer of friction material, such as a resinous layer containing powdered filler, or cork or felt. When the magnetic recording medium 31 is made in the form of a tape of non-magnetic material, such as paper or plastic or resin material, an impelling or capstan roller, ⅞ of an inch in diameter, will establish a good coupling driving engagement with such tape for driving it at a constant speed if the tape encircles about ⅓ of the periphery of such impelling roller.

The driving arrangement for the recording medium may be so designed so that when the magnetic recording medium, such as the flexible thin tape 31 of limited strength is impelled along the normal path 31-F at a slow speed by the driving forces imparted thereto by the capstan roller 37, the portion of the tape moving from the supply reel 32 past the erasing and recording heads 41, 42 to its position of engagement with the capstan roller 37 is subjected to such small tension forces that they are insufficient by themselves to maintain stable coupling engagement between the pole faces of the two magnetic heads 41, 42 and the facing portions of the moving tape 31 bridging the pole gaps of the two heads.

Stable contact conditions between the pole faces of each magnetic head 41, 42 and the portions of the moving recording medium 31 bridging the pole gap are assured notwithstanding the limited small tension forces to which the moving recording medium is subjected, by placing in front of the pole gap of each of the two magnetic heads 41, 42 a holder or pressure pad 81 arranged so that when a recording or playback operation is carried on the holder pad 81 engages the exterior side of the tape and maintains or presses the inwardly facing side of the tape along which the magnetic recording medium is exposed into positive contact engagement with the pole faces of each magnetic head bridging the pole gap region to assure stable flux interlinkage between the windings of each magnetic head and the magnetic particles of the recording medium bridging the gap.

Each of the holder pads 81 may be mounted on a separate lever arm 82 pivotally mounted at 82—1 and subjected to a biasing action as by a spring 82—3 so that when each lever is subjected to actuating forces exerted thereon by links 83, respectively, the two levers are actuated to bring their respective holder pads 81 into engagement with the outwardly facing side of the portions of the moving tape 31 facing the pole faces of the two magnetic heads 41, 42 to assure positive and stable contact engagement between the pole faces of the two heads and the magnetic particles of the moving recording medium, notwithstanding the small tension forces to which the moving recording medium is subjected.

As indicated in Fig. 1, each of the holder pads 81 is normally held by the biasing means 82—3 away from the facing pole faces of their respective magnetic heads 41, 42 so as to leave open a substantial channel space 84 between each pad and the facing magnetic head for enabling ready placing or threading the tape or, in general, the recording medium 31 along the path of the normal forward reeling motion 31–F as well as ready removal or unthreading of the tape.

In other words, under normal conditions when no normal forward reeling operation is carried on, the entire forward reeling path 31–F along which the recording medium or tape is guided from the supply reel past the transducer heads and the capstan roller 37 to the take-up reel is open and forms a free, relatively-wide channel into which the tape may be placed or from which it may be removed. However, as indicated diagrammatically in Fig. 1, each time the drive control mechanism is actuated to bring into action a normal forward reeling operation by actuating, for instance, the forward push rod 121 to the inward position, it will operate the lever 72 to exert through a link 85 connecting it to the two links leading from the two pad levers 82 associated with the two magnetic heads, for causing the two pads 81 to be brought to their operated position in which each pad holds a portion of the tape in positive stable coupling engagement with the facing portion of the respective magnetic heads 41, 42.

Foolproof operation of this mechanism is made possible by interposing in each of the two links 83 through which the control lever 72 is connected to the two pad operating levers 82 a spring 83—1 so designed that when the two links 83 are actuated by the actuation of the control lever 72 to the operated position, the two springs 83—1 will be subjected to sufficient tension for overcoming the biasing forces exerted by the two biasing springs 82—3 associated with each pad lever and cause the two levers 82 to be operated for bringing their respective pressure pads 81 into the proper contact engagement position in which they hold portions of the tape in positive stable engagement with the facing pole faces of the two magnetic heads.

In a practical form of recording mechanism of the type shown diagrammatically in Fig. 1, each end of the recording medium 31 made in the form of a thin flexible tape of the type described above may be connected to the inner core or drum 34 of each reel by inserting the end of the tape into an axially directed slit formed in the reel core wall and then turning the reel until one convolution of the tape retains the inserted tape end in its position on the exterior of the core, at least one side wall of each reel being provided with a generally radial opening or slit so as to make it possible to grip the end of the tape brought against the open periphery of the reel and place the gripped end of the tape in the slit of the reel core 34.

When carrying on reeling operations with such reel and tape arrangement, the end of the tape will automatically be pulled out from the reel from which it is unreeled when the full length of the tape has been transferred to the reel on which it is reeled.

In accordance with one phase of the invention, the reel drive mechanism is so designed as to assure that the driving forces for impelling the tape from one reel to the other subject the tape to an initial tensioning force sufficient to move a limit control member, such as limit member 100 from a non-operated position to the operated position shown in which they perform a control action establishing the reel impelling conditions under which the impelling drive connections are maintained to continue the reeling operation until either the drive control arrangement has been stopped by the actuation of a stop control member or until the whole length of the recording medium or tape has been transported from one reel to the other.

Figs. 2 through 6 show in greater detail one form of construction for the limit switch assembly 100. The assembly includes two guide members placed in the record track guide path. The lower member 140 is in the shape of a plate having an upstanding curved flange 141 having a concave surface 142 which defines the outer wall of a record track guide channel 143. The upper member 144 is generally cylindrical in shape, a portion of the cylindrical periphery being cut away as indicated at 146 to provide a convex surface 148 which defines the inner boundary of the record track guide channel 143. The upper and lower member 144 and 140 may be suitably secured together as by the screws 150, so that flange surface 142 is uniformly spaced from the cut surface 148 by an amount suitable for a passage of the record track therebetween.

Figures 3, 6, 7:
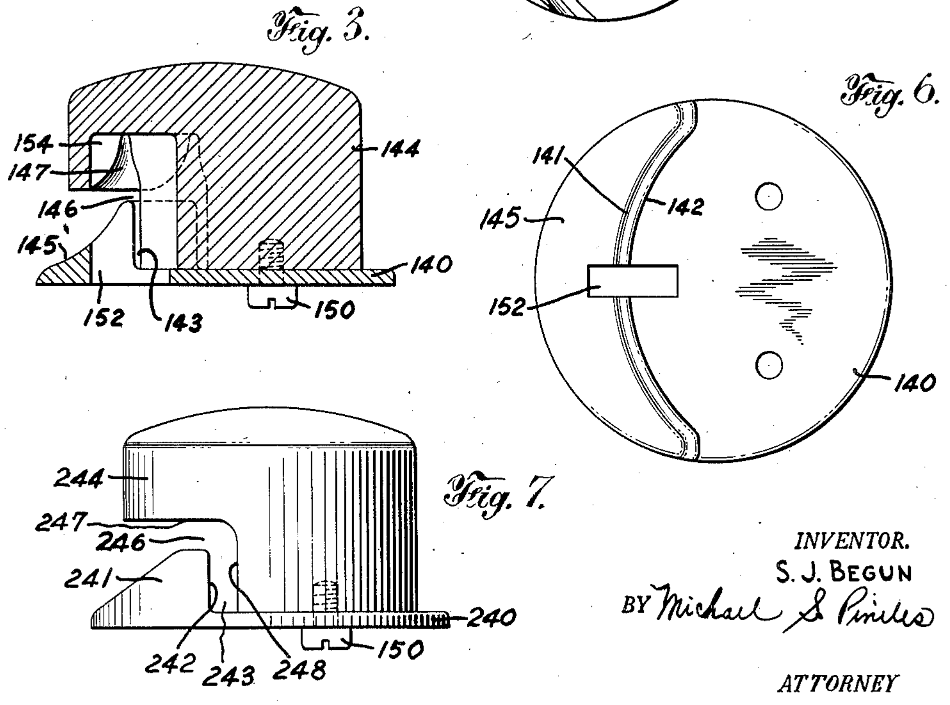
Fig. 6 is a top view of the lower guide member.
Fig. 7 is a side view of modified guide members.

The lower member 140 is slotted at 152, the slot cutting partly through the flange 141 as more clearly shown in Fig. 6. The upper member 144 is provided with a corresponding hollowed out cavity 154 which projects through the surface 148 as more clearly shown in Figs. 3 and 5.

The slot 152 and the cavity 154 together form a passageway in the switch assembly for the reception of a sensing finger 156 which may be mounted on a switch generally indicated at 158 in Fig. 2. The switch is there shown as including two electric contacts or points 160 and 161, one of which 161 is secured to a flexible sheet metal member 164. The contact 160 is shown as immovably held in place. A second flexible sheet metal arm 166 holds the finger 156 and is linked with the movable point holding member 164 by an over-center spring linkage using a generally arcuate spring 170 having slotted ends held on small projections 171 and 172 on the arms 166 and 164 respectively. These flexible arms are secured at their base and have sufficient elasticity to display a limited flexibility adjacent the points at which they are secured. The full line position of these arms as shown in Fig. 2 is their normal inactivated position toward which they are biased by their own elasticity. Movement of the finger 156 to the dotted line position shown in this figure will cause the over-center spring 170 to trip the arm 164 to the dotted line position in which it holds contact 161 against the contact 160. Circuit connections may be made to the members on which the contacts 160, 161 are mounted.

The outer surface 145 of flange 141 is inclined as shown in Figs. 2 and 3 so as to guide inwardly urged lengths of record track upwardly and toward the record track channel 143. The upper cylindrical member 144 is also provided with an upwardly directed groove 147 extending over the flange 141 to permit passage of the record track into the channel 143.

Positioning of the record track along the path shown in Fig. 1 may be effected by merely placing the record track in a threading path around the capstan 102, alongside the core 29, in the gap of core 28 and around the exterior of the limit switch guide assembly 100 followed by the initiation of a reeling operation.

As the reeling commences, tension appears in the record track as a result of the impelling forces imparted to it by the take-up or supply reel. The tensioning forces urge the record track to follow its shortest path and cause it to climb up the inclined outer surface 145 of flange 141. When the record track reaches the top of the flange 141, it is urged downwardly and inwardly by the walls of the groove 147 and the channel surface 148.

The lateral movement of the record track toward the channel 148 moves the sensing finger inwardly along its passageway and against the outward biasing action of the flexible switch arms 164 and 166 together with the spring 170. When the tape reaches the channel 148 the sensing finger is moved inwardly enough to trip the limit switch to the operated position. The unreeling of all the record track from the supply reel 21, or the take-up reel 22, if the reeling is in the rewind direction, will cause the longitudinal withdrawal of the tape from the channel 148 and permit the sensing finger 156 to be moved outwardly along its passageway under the influence of its biasing mount to deactivate the limit switch.

It appears obvious that any other switch arrangement may be used in place of the switch 158 shown in Fig. 2. However, the switches that are best suited are the well known micro-switches, which require very little force and movement for actuation.

Similarly, the record-track guide channel of the limit switch guide members need not be curved, as shown in Figs. 2 through 6, but may be of any other configuration.

Fig. 7 illustrates a modified form of limit switch guide members, in which the record-track guide channel 243 is straight. The guide members here shown are similar to those of the construction of Figs. 2 through 6, a lower plate-like member 240 having a shoulder 241 providing a flat guide wall 242 and an upper generally cylidrical guide member 244 being cut away at 246 to provide a flat guide surface 248. The lower surface 247 of the upper guide member 244 above the cut away region 246 is here shown as not provided with a tape-receiving groove, such as the groove 147 of Figs. 2 and 3, the surface 247 being instead spaced above the top of the shoulder 241 by a distance sufficiently large to permit a record track in the form of a tape to be folded and pulled through into the channel 243.

This distance, however, is not as large as the width of the tape, so that it is almost impossible for the tape to be removed from the channel 243 through the tape admitting gap in normal operation. This feature insures the actuation of the limit switch such as switch 158 into its operated position during a reeling operation and its maintenance in the actuated position as long as record track remains in the guide path adjacent the limit switch assembly.

The guide assembly of Fig. 7 operates in a manner similar to that of Fig. 2, differing, however, in that as tensioning forces cause the tape to move upwardly and inwardly along the shoulder 241, the tape engages the surface 247 and is caused to fold and move into the channel 243 where it unfolds and is held against unintentional withdrawal. Additionally, the guide assembly of Fig. 7 may be used on a straight portion of the record-track path.

If desired the switch guide assembly of Figs. 2–6 may be modified by making the record track channel 143 straight as shown for example by the channel 243 of the construction of Fig. 7. Either a straight or curved channel may be used in the construction shown in Fig .1.

Alternatively the groove 147 may be eliminated from the limit control assembly 100 so that the tape must be folded to be pulled through the tape-admitting gap into the channel 143, in the manner indicated in connection with Fig. 7.

In place of the sensing finger movement shown, there may be provided in the upper cylindrical member 144 a sensing finger support from which the finger depends into the cavity 154 and on which it may slide or pivot along the cavity under the action of the record track and a biasing means.

As another modification the sensing finger may be mounted for pivoting around an axis such as a vertical axis positioned longitudinally along the cylindrical guide member 144 or 244. The cavity 154 and the slot 152 may be arcuately shaped to permit such pivoting and the finger may be biased outwardly for engagement and rotation by record track entering into the channel 143 or 243. With a proper selection of sensing finger pivot points and slot shapes, the limit assembly may even be made sensitive to record track movement in only one direction, movement in the other direction being arranged to be inoperative for moving the sensing finger in the slot in the direction required for actuating the limit switch.

As indicated above the reeling motors may be of the low power constant speed type. The constant speed feature enables the direct and simple driving of the capstan 37, whereas the low power permits suitable forward reeling with a direct connection between the take-up motor 176 and the take-up reel 33. Although the effective diameter on which the record track is wound on the take-up reel 32 varies as the amount of wound record track on this reel changes, the take-up motor 176 does not control the linear speed of the record track, but merely acts to take-up the slack between the capstan 37 and the take-up reel. The frictional engagement between less than one turn of the record track and the capstan roller 37 insures the forward reeling at the desired constant speed. The poor leverage of the take-up motor 176 acting along the relatively large effective diameter of the take-up winding permits the record track feed of the capstan to control the rotation of this motor. The take-up motor 176 should be so selected as to provide the required R. P. M. for take-up at the desired forward reeling speed with the minimum and maximum effective diameters of the take-up winding.

The impelling of the record track with less than one turn of record track contacting the friction facing of the capstan roller is an important feature of the invention, and provides a simple constant speed reeling arrangement which does not require complicated threading or anchoring of the record track. The record track need only be placed part way around the capstan roller; the taking up of the slack to lightly engage the record track with the friction surface of the capstan roller will automatically provide the desired constant speed reeling engagement. The taking up of the record track slack subjects the record track to only slight tensional forces so that when starting a reeling operation the leading end of the record track need not be firmly anchored on the take-up reel. The penetration of the record track into the limit member channel does not appreciably affect the tensile forces imparted to the record track when taking up the slack for commencing a reeling operation.

Under some conditions it may be desired to rapidly reel the record track in the forward direction to reach some desired portion containing a selected recording. In the arrangement shown in Fig. 1 the record track may be placed in the dash-triple-dot guide path 31—5 so that it is wound on take-up reel 33 without contacting the capstan roller 37 or transducing unit 36. As so arranged a record track which requires thirty (30) minutes for complete reeling at a slow forward speed may, for example, be completely reeled at high speed in times as short as one minute. The rewind reeling may also be effected at the same high speed.

Figure 8:
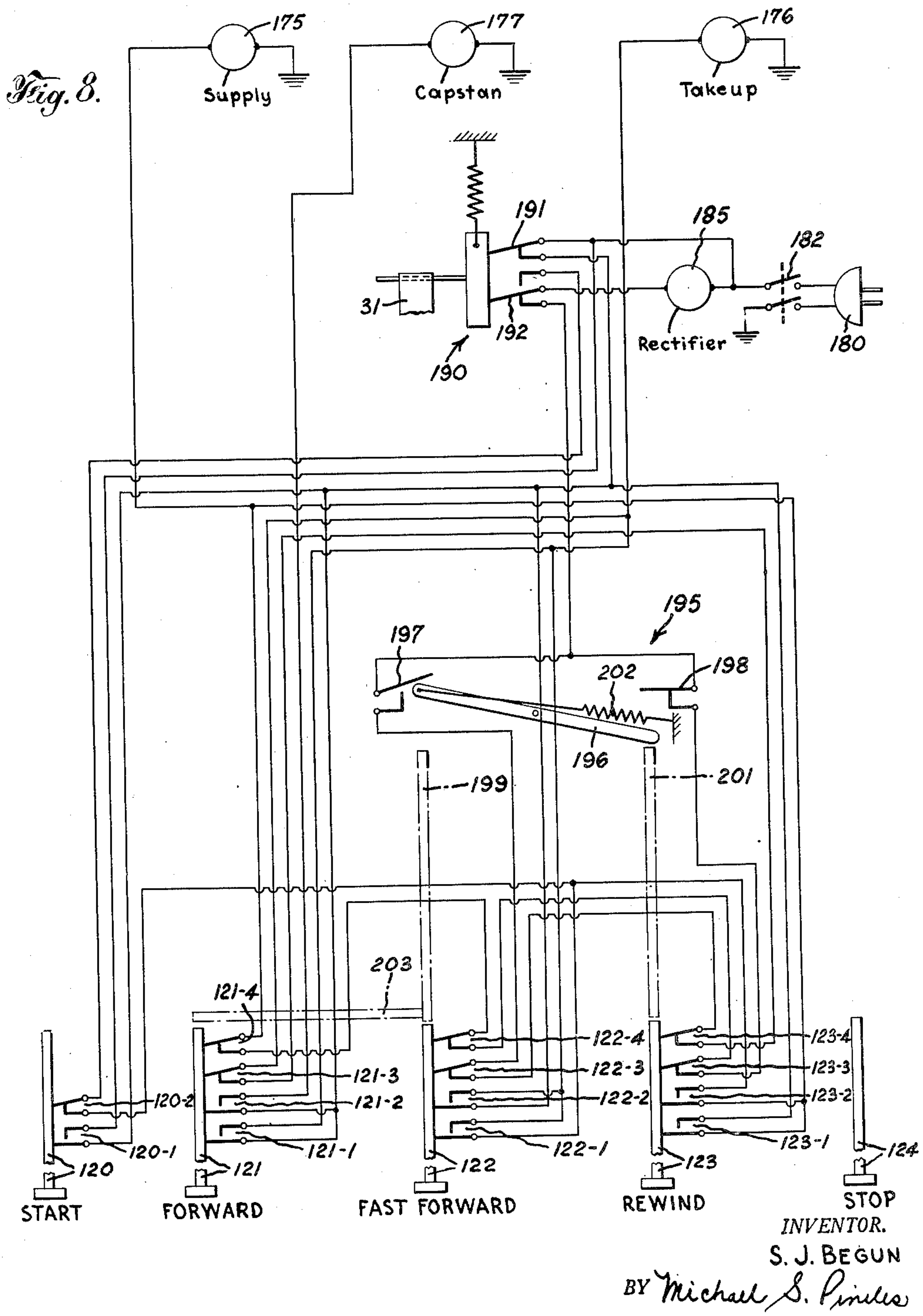
Fig. 8 is a wiring diagram of a limit switch and control assembly.

Fig. 8 illustrated a wiring diagram that may be used for controlling the reeling operations. A connector 180 is shown for establishing an external power supply feed, such as by plugging into a conventional 110 volt 60 cycle supply line. From the connector the alternating current is fed through an "on-off" switch 182 through one of the switches 191 of a limit switch assembly 190, then through the various switches mechanically linked with the separate push rods and to the impelling motors 175, 176 and 177. A rectifier 195 is shown as providing direct current through the switch 192 of the limit switch assembly, then also through various switches of the push rod switch assembly and to the same motors.

The limit switch assembly 190 is shown diagrammatically and may be an assembly similar to that shown in Fig. 2 having two movable blades for controlling three main power circuits, as shown, in response to the presence of record track 31. The switch assembly 190 is illustrated in the activated position in which the switch 191 establishes an A. C. power supply to the switches 121—1, 121—2, 122—2, and 123—1 associated with their push rods 121, 122 and 123. The limit switch 192 in its actuated position, shown, establishes a D. C. power feed to an alternating switch assembly 195 which includes a pivotally mounted lever 196 and two switches 197, 198 mounted so as to be opened by the respective ends of the lever 196. Push rod extensions 199 and 201 are diagrammatically shown as arranged for tripping the lever 196 from the position shown in which its left end keeps switch 197 open to the reverse position in which its right end keeps switch 198 open. Over-center spring 202 may be used to accentuate the tripping actions. The push rod extension 199 is shown as not secured to its associated push rod 122, and as having a wing 203 permitting its actuation by either the push rod 122 or the push rod 121.

With the control set as shown in Fig. 8, a D. C. power feed is established to the supply motor 175 through the alternating switch 198 and the switches 123—3, 122—4 and 121—4. As pointed out in the copending Dank application, Serial No. 690,878, filed August 16, 1946 issued as Patent No. 2,535,486 on December 26, 1950, it has been found that the passage of direct current through a rotating A. C. induction motor will produce a braking action of great value for promptly stopping the rotation of the motor.

The switch 120—1 associated with the Start push rod 120 shunts the contacts of the limit switch 191 so as to permit A. C. power feed even though the record track 31 is not in the guide channel 143 and the limit switch assembly 191 is in its inactivated position.

For initiating a forward reeling operation at slow speed, the record track is placed in its threading path, and the forward push rod 121 is moved to its inward latched position to establish an A. C. power connection from the limit switch 191 to the capstan motor 177 and the take-up motor 176. With the apparatus so set, the Start push rod 120 is then moved inwardly to shunt the open switch 191 and establish the A. C. power feed to the capstan and take-up motors. Under the tensioning forces developed, the record track is impelled into engagement with the sensing finger of the limit switch assembly to actuate the limit switches 191 and 192. The Start push rod 120 may then be released, the A. C. power supply being maintained through the actuated switch 191. While the limit switch 192 is in its deactivated position, D. C. power feed is established to the switch 120—2 associated with the push rod 120, and this D. C. power feed is interrupted by the switch 120—2 upon actuation of the Start push rod to its inward position.

The forward reeling having been established, as set forth above, it will be maintained as long as record track remains in the limit switch channel 143 and the controls are not changed. The removal of the record track from the limit switch channel 143 permits the limit switches 191, 192 to move upward to their inactivated position terminating the A. C. power feed to the capstan and take-up motors. If the forward push rod 121 is unlatched during operation while the record track remains in the limit switch channel, the A. C. power feed is interrupted by the switches 121—1 and 121—2. The withdrawal of the forward push rod 121 simultaneously establishes the D. C. power feed to the supply motor 175 for more rapid arresting of the reeling operation. Such unlatching of the forward push rod may be effected, if desired, merely by inward operation of the Stop push rod 124.

To effect a fast forward reeling operation, the Fast Forward push rod 122 is latched in its inward position, and with the record track in the proper threading path the Start push rod 120 is moved to its inward position. A. C. power feed is thereby supplied only to the take-up motor 176 via the switch 122—2. As in the slow forward operation the Start push rod 120 may be released after the limit switches are moved to their actuated positions. The pressing members 112 and 110 are not actuated by the Fast Forward push rod 122 so that the take-up motor 176 is operating against very little resistance and the reeling is effected at a speed much higher than the recording or playback speed. The withdrawal of the record track 31 from the limit switch guide channel during a fast forward reeling will release the limit switches 191, 192. The A. C. power feed is thereby terminated and D. C. power feed is simultaneously established through switches 120—2 and 122—1 to the take-up motor 176 to apply braking forces for quickly stopping the take-up reel which may be filled with record track and have a large rotational inertia. On the other hand, if the Fast Forward push rod 122 is unlatched and retracted before the record track has been completely unwound from the supply reel it may permit the rapidly rotating supply reel to continue to unwind a considerable amount of the record track after the take-up reel has been stopped. The construction of Fig. 8 prevents this continued unreeling or "throwing" of record track and consequent damage by establishing a D. C. braking current to the supply motor via the switches 198, 123—3, 122—4, and 121—4 simultaneously with the opening of the A. C. power feed when the Fast Forward push rod 122 is retracted. Alternating switch lever 196 leaves the switch 198 closed even though the Fast Forward push rod 122 is withdrawn.

A rewind operation may be started in a manner similar to the other reeling operation by setting the Rewind push rod 123 in its inward latched position. An A. C. power feed is thereby established to the supply motor 175 through the switch 123—1. Removal of the record track from the limit switch channel 143, as when the rewinding is completed permits the limit switches 191, 192 to move upwardly to their deactivated positions which disconnects the A. C. power feed and establishes a D. C. braking power feed to the supply reel motor by means of the switches 120—2 and 123—2. However when the rewind push rod 123 is retracted before the rewinding is completed a D. C. braking power feed is established through switches 197, 122—3, 123—4 and 121—3 to the take-up motor 176 to quickly stop the heavily loaded take-up reel.

The retraction of any of the push rods 121, 122 and 123 before the termination of the corresponding reeling operations may be caused by the inward actuation of any of the push rods other than the Start push rod 120. Most combinations of such push rod actuations will produce no untoward effects. However, when during a fast forward reeling the Forward push rod 121 is actuated to release the Fast Forward push rod 122, the prompt slowing of the record rack movement by the capstan shaft and pressing members will tend to cause the rapidly rotating supply reel to "throw" record track. Throwing of this nature may be guarded against as by short circuiting the switch 121—4 to cause the supply reel motor to apply braking forces during a slow forward reeling or by providing mechanical interlocking means to prevent the inward actuation of the Forward push rod 121 while the Fast Forward push rod 122 is in its inward latched position.

The Record push rod 125 may merely be used for establishing, when inwardly actuated, recording circuits with the transducer cores. The record push rod may also be used to establish playback circuits when retracted. A suitable recording-reproducing switch circuit such as that shown in Fig. 1 may be employed. Other convenient switch circuits such as those disclosed in the copending Begun application, Serial Number 714,156, filed December 5, 1946, may also be used.

The interlinking of the record push rod 125 in the push rod latching assembly assists in preventing inadvertant erasure or superimposed recording on a record track having a recording intended to be kept intact.

The sensing finger movement across the channel 143, 243 of the limit switches shown in Figs. 7 through 11 may be curved if desired, as by pivoting the finger around a vertical axis. By properly shaping the curved path, the sensing finger may be also made responsive to record track movement in only one direction, movement in the other direction merely urging the sensing finger against a stop placed at the end of its path. With such an arrangement, two limit switches may be employed if responsive to record track movement in a different direction. The control circuit shown in the copending Dank application may be used with such a two-limit switch construction.

Fig. 9 diagrammatically illustrates a modified form of magnetic transducing apparatus according to the invention. The record track guide paths 31—4 and 31—5 are here shown as both extending on one side of the supply and take-up reels 32, 33. The forward guide path 31—4 is established by a roller 26, a magnetic recording reproducing core 29, capstan roller 37 and limit switch control assembly 190. Adjacent the recording reproducing core 29 there is shown a magnetic erasing core 28 which may be of the type fed by low frequency alternating current as described and claimed in the co-pending Begun application Serial No. 723,374, filed January 23, 1947. Cooperating with the pole faced portions of the recording reproducing core 29 there is shown a pressing member 182 similar to that illustrated in Fig. 1 and actuated through a link 83 by a reeling control assembly which is not shown but which may also be similar to that illustrated in Fig. 1.

The windings of the magnetic cores 28 and 29 are connected to a source of erasing current, a signal source 48, a signal reproducer 46 as well as the recording amplifier 149 and play-back amplifier 149—1 and oscillator 47 through multipole switch generally indicated as 40. As indicated the switch 40 may control the Record and Play-back operations by connecting the windings of core 29 either to the out-put of the recording amplifier 149 or to the in-put of play-back amplifier 149—1 and by biasing the signals to be recorded with the out-put of oscillator 47. The erasing currents for the windings of core 28 may be fed through the switch 40 from the source such as the conventional 60 cycle A. C. power supply as indicated, a plug 103 being used for connection into the conventional power outlet box and on-off switch 104 being shown for controlling the power fed to the transducer. Power take-off indicated by the arrow 105 may be used for supplying power to the tape impelling means in the form of one or more electric motors.

Inasmuch as the oscillator 47 need only supply biasing currents in the arrangement shown in Fig. 9 it may be a very simple form containing only a single space discharge means. For example, a single conventional vacuum tube may be used as an oscillator or one of the components of a multi-component vacuum tube as for example one triode of a twin triode tube may be used in the high frequency generator 47, the other triode being used as a part of one or both amplifiers 149, 149—1.

The high speed reeling path 31—5 is illustrated as established around a roller 126 to by-pass the capstan roller 37 and permit reeling of the record track in either the forward or the rewind direction without interference by the capstan.

For simpler threading of the record track 31 along its record track guide paths there may be provided a set of cover plates 110, 111, 112 and 113 as represented by the dash line outlines. These cover plates may be placed above the level of the record track guide path and so spaced from each other as to provide a channel 71 into which the record track may be placed. The end of the record track may be unwound from the supply reel 32, placed in the threading channel to and then secured to the take-up reel 33. The application of impelling forces to effect reeling will cause tensioning forces to appear in the record track and will move the record track into its proper guide path as illustrated. The lever 82 is of course retracted from the channel 71 when the threading is effected. A high speed reeling operation, such as for rewinding of the record track or for reeling it rapidly in a forward direction to find a desired spot in a recording, may be effected by lifting the record track out of the channel portion 71—1 which surrounds the capstan roller and placing this portion of the record track into the channel 71—2 around the guide roller 126. Such shifting of the record track disconnects it from the high-inertia capstan and permits it to move at high speed in either the rewind direction or the forward direction for quickly reaching a desired region on a long record track.

The channels 71 and 71—2 may be provided adjacent the capstan with suitable regions wide enough for simply picking up the record track with the fingers and transferring it from one of the channels 71—1, 71—2 to the other, as desired.

The roller 126 may be so placed that in the high speed path the record track is magnetically linked with the recording-reproducing core 29. This feature enables the operator to hear signals corresponding to the record and to control the reeling accordingly. For example, when reeling along path 31—5 to reproduce a selected portion of the record track, the jargon emanating from the signal reproducer, even though in reversed signal sequence, is readily distinguishable as between instrument music, singing and speech and between low pitched and high pitched sounds. With a little experience the listener will be able to accurately control the reeling to reach any desired position.

In the construction shown only one pressing member 82 is employed so that the erosion of record track and/or magnetic pole face material is diminished.

Fig. 10 illustrates a further form of magnetic transducing system according to the invention. In this construction, which is generally similar to that of Fig. 1, only one guide path need be provided for the record track 31 to take as it moves from the supply reel 32 past the limit control assembly 106, the magnetic cores 41, 42, around the capstan and onto the take-up reel 33. The capstan includes a capstan roller 237 and a disengageable massive flywheel 245 and slow forward reeling is effected by maintaining the flywheel 245 in engagement with the capstan roller 237 and suitably impelling the capstan roller.

High speed reeling operations may be carried out by moving the record track in the same path and disengaging the capstan roller 237 from the flywheel 245 and from external record track impelling means so that the capstan drive and the high rotational intertia of the flywheel do not offer much resistance to the reeling.

Pressing pad arms 281 and 282 pivoted at 283 and 284 respectively may be used to be moved into actuated position in which the arm 282 is shown for establishing highly stable and uniform magnetic linkage between the record track and the magnetic cores 41 and 42 as indicated above in connection with Fig. 1. In the construction of Fig. 10, however, the pads are shown as independently operated by links 285, 286 so that both need not be set in the actuated position during play-back of a recording, when the erasing core 41 is functionless. Frictional wear of the record track and/or magnetic pole faces is greatly diminished in this manner since play-back operations are usually much more numerous than recording operations. To further minimize friction, the magnetic pole faces may be highly burnished and may be disposed so that with the arms 281, 282 in their non-actuated position in which the arm 281 is shown, the pole faces do not engage the record track and permit it to move freely.

As shown in Fig. 10 a switch control assembly generally indicated as 270 may be used for controlling the reeling operations by push rods 220, 221, 222, 223, 224 and 225 in a manner similar to that described in connection with Figs. 1 and 8. The arm actuating links 285, 286 are illustrated as connected for independent actuation by the Record and Forward push rods 224 and 221 respectively through levers 288 and 289. The Forward push rod 221 is shown as also connected to operate, by means of link 287, the flywheel engagement which may be arranged as shown in Fig. 11. The push rods may be connected to the corresponding reel control switches in any convenient manner, the arrangement shown in Figs. 1 and 8 for example being suitable.

If desired, the Record push rod 224 may alone be used to establish the recording and reproducing circuits, depending on whether it is in the outer non-actuated position shown in Fig. 10 or in the inner actuated position in which the push rod 222 is shown. Additional Record-Playback switches such as the switch 43 are not needed in such a modification and the circuits may be controlled as indicated in the copending Begun application Serial No. 714,156, filed December 5, 1946, for example.

Fig. 11 indicates in detail the construction of one form of capstan disengaging arrangement according to the invention. The lower portion of the capstan roller 237 may be provided with an outwardly extending flange 238, the periphery of which is dished downwardly as indicated at 239. The roller 237 is mounted and journalled on a bearing shaft 240 as by the bearing 242 and the bearing shaft 240 also has journalled thereon a flywheel 245 which is movable axially with respect to the bearing shaft 240. The flywheel 245 may be supported as by being journalled in a support 247 as shown. Between the top of the flywheel 245 and the bottom of the capstan roller 237 there is shown a disc 249 which may be made of felt or other friction material. Below the lower end of the shaft 240 is mounted a control shaft 251 having a flat 253 and an arm 254 pivotally arranged so that under the actuation of the link 287 the control shaft 251 may be rotated so that either the flat 253 or the remainder of the shaft surface is presented for engagement with the bearing shaft 240. The members are so arranged that when the flat 253 is presented toward the bearing shaft, the bearing shaft 240 is permited to drop slightly and to carry the lower face of the flange 238 into frictional engagement with the flywheel 245 via the frictional disc 249, and when an adjoining portion of the surface of control shaft 251 is presented it engages the lower end of the bearing shaft 240 and raises it sufficiently to separate the flange 238 from its engagement with the flywheel 245. The arm 254 may be biased as shown toward a stop 255.

Impelling of the record track 31 in the forward or transducing direction, indicated by the arrow 31–F may be effected by rotating the capstan roller 237 as by means of a motor driving the shaft 240. The drive connection to the shaft 240 may be by means of a belt around, or a roller frictionally engaging, the flywheel 245 or any other conveniently located drum surface.

The frictional engagement provided by the frictional disc 249 is sufficiently established by merely having the weight of the capstan roller supported by the disc 249, but if desired additional biasing means may be provided. Fig. 11 illustrates such additional biasing means in the form of a spring 257 compressed between the flywheel 245 and a collar 260 fixed on the bearing shaft 240.

Direct drive of the shaft 240 or flywheel 245 is suitably produced with an A. C. induction motor of the type similar to those conventionally used for phonograph turn tables and which provides substantially constant speed rotation. During transducing the take-up reel 33 may be rotated by an independent motor or by power take-off from the constant speed motor so as to wind up the record track fed by the capstan roller 237. An independent take-up motor should be of sufficiently low torque so as not to directly control the reeling speed of the record track leaving the supply reel. Power take-off actuation of the take-up reel should permit enough slippage for the same purpose. The low powered phonograph turn table type of A. C. induction motor provides a torque sufficiently low for direct drive of the take-up reel 33.

Rewinding of the record track is provided for by establishing an impelling connection to the supply reel 32 to reel the record track in the direction indicated by the rewind arrow 31–R. Inward actuation of the rewind push rod 223 establishes the rewind circuits, and simultaneously unlatches the Forward push rod 221 so that the pad arms 281, 282 are biased away from the record track guide path and the shaft 240 is raised on the control shaft 251 to disengage the capstan roller 237 from the flywheel 245. Rewinding is then accomplished with greatly minimized frictional resistance along the transducer cores 41, 42 as well as without the retarding effect of the high inertia flywheel 245.

With the arrangement shown, fast forward reeling is obtained by inwardly actuating the Fast Forward push rod 222 which likewise causes the capstan roller to be disengaged from the flywheel and the pads 81 to be retracted but energizes the application of winding forces to the take-up reel 33. The small residual friction and dampening inertia permits high speed forward reeling to be established in a similar manner.

The rewinding force applied to the supply reel 21 may be established by power take-off from the constant speed motor mechanically linked to the shaft 240 or by a separate motor independently connected to the shaft 61 on which the supply reel is mounted. If desired, a single motor may be connected so as to drive either or both the supply reel 32 and the take-up reel 33. The capstan may also be driven from the single motor.

The limit control assembly shown in connection with the above figures is extremely reliable in operation even with record tracks in the form of a limp paper or plastic film containing a bonded stratum permanently magnetizable particles as described in the above mentioned Kornei application. Once the record track is brought into the guide channel 143 or 243 the limit switch will become actuated and will remain actuated until the entire length of record track is reeled through the channel. The record track, even if a narrow paper tape, is automatically and easily brought into the channel without danger of overstressing.

The driving engagement of only about a half turn of record track with the capstan as shown in the figures also enables the use of simple reeling arrangements. When substantially more than a half turn is so engaged, the engaged record track forms a loop so small that extra record track guiding surfaces are necessary to properly direct the establishment of the loop. Furthermore, the ease of threading of the record track decreases rapidly as the capstan loop size decreases.

The expression "magnetic record transducing" as used herein in the specification and claims is intended to mean either the operation of magnetically recording signals on a magnetic recording medium, or the operation of reproducing magnetically recorded signals, or the operation of erasing magnetically recorded signals, or any combination of two or more of these operations.

It will be apparent to those skilled in the art that the novel principles of the invention disclosed herein in connection with specific exemplifications thereof will suggest various other modifications and applications of the same. It is accordingly desired that in construing the breadth of the appended claims they shall not be limited to the specific exemplifications of the invention described herein.

I claim:

1. In a magnetic record transducing apparatus for transducing recordings on successive elements of an elongated permanently magnetizable record track member stored in coiled form on a supply reel and transduced by unreeling the elongated record track in a forward direction from the supply reel along a slow forward guide path past transducing means and onto a take-up reel where it is reeled up in coiled form under the action of forward impelling means connected to forward power supply means: motor means fed by the forward power supply means for fast forward reeling the record track from the supply reel to the take-up reel at a speed higher than the transducing speed; said motor means fed by rewind power supply means for imparting rewinding forces to the supply reel to impel the record track from the take-up reel in a rewind direction along a rewind guide path and onto the supply reel; limit control structure located at a section of said guide path having an element exposed to contact by the moving record track as it moves along the said guide paths; and said motor means applying braking forces to the reels; said limit control element being movable from a non-operated position to a single operated position by the record track present in the guide paths; and reeling control selector apparatus for selectably establishing power connections to said motor means and effecting reeling of the record track in the desired direction; said limit control element being connected with the selector apparatus and the motor means for applying braking forces to the supply reel when the limit control member is moved to its non-operated position and the reeling control selector apparatus is set for rewinding for applying braking forces to the take-up reel when the limit control member is in its operated position and the reeling control selector apparatus is moved from the rewind setting.

2. In a magnetic record transducing apparatus for transducing recordings on successive elements of an elongated permanently magnetizable record track member stored in coiled form on a supply reel and transduced by unreeling the elongated record track in a forward direction from the supply reel along a slow forward guide path past transducing means and onto a take-up reel where it is reeled up in coiled form under the action of forward impelling means connected to forward power supply means: motor means fed by the forward power supply means for fast forward reeling the record track from the supply reel to the take-up reel at a speed higher than the transducing speed; said motor means fed by rewind power supply means for imparting rewinding forces to the supply reel to impel the record track from the take-up reel in a rewind direction along a rewind guide path and onto the supply reel; limit control structure located at a section of said guide path having an element exposed to contact by the moving record track as it moves along the said guide paths; and said motor means for applying braking forces to the reels; said limit control element being movable from a non-operated position to a single operated position by the record track present in the forward guide path and by record track present in rewind guide path; and reeling control selector apparatus for selectably establishing power connections to said motor means and effecting reeling of the record track in the desired direction; said limit control element being connected with the selector apparatus and the motor means for applying braking forces to the supply reel when the limit control member is moved to its non-operated position and the reeling control selector apparatus is set for rewinding, for applying braking forces to the take-up reel when the limit control member is in its operated position and the reeling control selector apparatus is moved from the rewind setting, and for opening the power connection to said motor means when the limit control member is moved to its non-operated position during a forward reeling as well as during a rewinding operation.

3. A magnetic transducing apparatus as defined by claim 2, including detecting means for determining when the record track is present in the said section of the record track guide path.

4. A magnetic transducing apparatus as defined by claim 2, including detecting means for mechanically determining when the record track is present in the said section of the record track guide path.

5. A magnetic transducing apparatus as defined by claim 2 including guide portions defining a wall interposed between a record track threading position and said section of the record track guide path, and including detecting means biased toward the wall for mechanically determining when the record track is present in the said section of the record track guide path.

6. A magnetic transducing apparatus as defined by claim 5, including detecting means biased toward the wall for mechanically determining when the record track is present in the said section of the record track guide path, and wherein the said limit switch means include also a passageway through which the detecting means may move into the wall.

7. A magnetic transducing apparatus as defined by claim 5, including detecting means biased toward the wall for mechanically determining when the record track is present in the said section of the record track guide path, and switch elements responsive to the position of the detecting means and connected to the control structures, and wherein the said limit switch means include also a passageway through which the detecting means may move into the wall.

8. A magnetic record transducing apparatus as defined by claim 5 including a record track holder in the form of a reel on which the record track may be held in coiled form, and in which apparatus the guiding and impelling means are arranged to uncoil the record track from said holder to move it in said guide path past the magnetic transducing means for performing a transducing operation and to rewind the record track on the holder by moving it back along substantially the same guide path.

9. A magnetic record transducing apparatus as defined by claim 5 in which the second set of guide portions are shaped to admit the record track into said section of the guide path under the actuation of record track reeling forces and to retain it in said section against the action of the record track reeling forces.

10. A magnetic record transducing apparatus as defined by claim 5 in which the second set of guide portions include a member extending between the threading position and the guide path section and shaped to permit easy passage of the record track in only one direction between said position and said section.

SEMI JOSEPH BEGUN.

REFERENCES CITED

The following references are of record in the file of this patent:

UNITED STATES PATENTS

| Number | Name | Date |
|---|---|---|
| 789,336 | Poulsen et al. | May 9, 1905 |
| 909,414 | Hytten | Jan. 12, 1909 |
| 1,138,744 | Garros | May 11, 1915 |
| 1,281,095 | Taylor | Oct. 8, 1918 |
| 1,484,545 | Aspley | Feb. 19, 1924 |
| 1,768,403 | Heisler | June 24, 1930 |
| 2,237,341 | Dungler | Apr. 8, 1941 |
| 2,357,675 | McCord | Sept. 5, 1944 |
| 2,364,556 | Somers | Dec. 5, 1944 |

FOREIGN PATENTS

| Number | Country | Date |
|---|---|---|
| 414,776 | Germany | June 16, 1925 |